(12) United States Patent
Schmitz et al.

(10) Patent No.: US 12,005,930 B2
(45) Date of Patent: Jun. 11, 2024

(54) AUTONOMOUS TRACTOR AND METHOD TO CULTIVATE FARMLAND USING THIS TRACTOR

(71) Applicant: AGXEED HOLDING B.V., Oirlo (NL)

(72) Inventors: Laurentius Hubertus Margaretha Schmitz, Mariahoop (NL); Joris Jan Hiddema, Grubbenvorst (NL)

(73) Assignee: AgXeed Holding B.V., Oirlo (NL)

( * ) Notice: Subject to any disclaimer, the term of this patent is extended or adjusted under 35 U.S.C. 154(b) by 429 days.

(21) Appl. No.: 17/295,822

(22) PCT Filed: Nov. 20, 2019

(86) PCT No.: PCT/NL2019/050758
§ 371 (c)(1),
(2) Date: May 20, 2021

(87) PCT Pub. No.: WO2020/106143
PCT Pub. Date: May 28, 2020

(65) Prior Publication Data
US 2022/0009521 A1  Jan. 13, 2022

(30) Foreign Application Priority Data

Nov. 22, 2018 (NL) ..................................... 2022048

(51) Int. Cl.
*A01B 69/04* (2006.01)
*A01B 73/04* (2006.01)
(Continued)

(52) U.S. Cl.
CPC ....... *B60W 60/0025* (2020.02); *A01B 69/008* (2013.01); *A01B 73/04* (2013.01);
(Continued)

(58) Field of Classification Search
None
See application file for complete search history.

(56) References Cited

U.S. PATENT DOCUMENTS 10,152,891 B2 * 12/2018 Rusciolelli ........... A01B 69/008
2009/0037059 A1 * 2/2009 Huster ................. G05D 1/0246
701/50

(Continued)

FOREIGN PATENT DOCUMENTS

| EP | 2441320 A2 | 4/2012 |
| EP | 2464207 A1 | 6/2012 |
| EP | 3251485 A1 | 12/2017 |

*Primary Examiner* — James J Lee
*Assistant Examiner* — David Hatch
(74) *Attorney, Agent, or Firm* — Richard M. Goldberg

(57) ABSTRACT

An autonomous tractor for autonomously crossing farmland, includes one or more sensors for detection of an obstacle when crossing the farmland, and a central processing unit (CPU) for receiving input signals from the the sensors and for controlling movement of the tractor based on the input signals in order to avoid the obstacle, a coupler for coupling an agricultural machine able to be coupled to the tractor, and the agricultural machine includes one or more additional sensors for detection of the obstacle, wherein coupling of the agricultural machine operatively connects the additional sensors to the CPU and automatically provides data to the CPU regarding the location of each of the additional sensors on the agricultural machine and one or more specifications of each of these additional sensors.

5 Claims, 9 Drawing Sheets

(51) Int. Cl.
  *A01B 79/00* (2006.01)
  *B60W 30/09* (2012.01)
  *B60W 60/00* (2020.01)
  *B60P 3/06* (2006.01)

(52) U.S. Cl.
  CPC ........... *A01B 79/005* (2013.01); *B60W 30/09*
         (2013.01); *B60P 3/066* (2013.01); *B60W*
      *2300/152* (2013.01); *B60W 2552/00* (2020.02);
       *B60W 2554/402* (2020.02); *B60W 2554/4029*
             (2020.02); *B60W 2555/20* (2020.02)

(56) References Cited

U.S. PATENT DOCUMENTS

| | | | |
|---|---|---|---|
| 2011/0209631 A1* | 9/2011 | Viaud | A01F 15/08 180/14.1 |
| 2017/0311534 A1 | 11/2017 | Rusciolelli et al. | |
| 2017/0357267 A1 | 12/2017 | Foster et al. | |
| 2018/0187398 A1* | 7/2018 | Forcash | E02F 9/264 |
| 2018/0325010 A1 | 11/2018 | Connell et al. | |
| 2019/0014723 A1* | 1/2019 | Stanhope | A01B 73/065 |

\* cited by examiner

AUTONOMOUS TRACTOR AND METHOD TO CULTIVATE FARMLAND USING THIS TRACTOR

GENERAL FIELD OF THE INVENTION

The present invention pertains in general to autonomous tractors for autonomously crossing and cultivating farmland.

BACKGROUND OF THE INVENTION

The adoption of technology in agriculture has improved the approaches that farmers use in the farmland nowadays. Modern agriculture has made it easy for farmers to achieve high produce while using less input. According the trends in the use of technology in agriculture, there are high concerns that the future of agriculture is bright. For example, mechanization in agriculture has reduced the overuse of manpower in doing some of the farming activities. As a consequence, agricultural machines have become bigger and bigger and more dedicated towards performing one type of cultivation. The introduction of autonomous tractors is considered a next step into the future of farming and it is expected that using autonomous tractors, the trend of bigger and more dedicated (specialised) farming machines will continue.

Self-driving cars are common these days. Based on the trends in regards to the advancement of technology, one could expect that the technology will also be used for cultivating farmland. At present farmers in advanced countries are giving a tactical approach to how they plant, harvest, as well as maintain their crops. A good example of new tactical approaches is the use of autonomous tractors in agriculture. The concept of autonomous tractors can be traced back prior to the introduction of the concept of precision farming in the eighties. During these days, farmers used GPS technology as a guide to the tractors across the farmland. The aim of such an approach was the reduction of fuel consumption and enhancing the efficiency of the tractors and the farming activities. As such, these initial steps formed the basis for the development of autonomous tractors, following the introduction of technologies that improved communication over wireless devices. Autonomous tractors employ much the same approach as the driverless vehicles, i.e. using advanced control systems and sensors. With the inclusion of auto-steering abilities, such tractors have added control abilities. Evidently, the launch of the autonomous tractors is considerably a manifestation of the extended use of technology in farming.

Benefits to farmers are obvious. It is an undeniable fact that farming is not an easy undertaking, it involves working for long hours and the subscription to hard labor in harsh weather conditions. Taking into consideration the common state of farmers, the majority of them have no employees to task them in the farmland and hence, have to do everything all by themselves. The autonomous tractors can be a positive outcome. Next to this, accuracy and precision are important aspects in agriculture in various aspects such as planting. Regarding for example such planting, the autonomous tractors can be equipped with automatic planting systems that ensure high accuracy when planting. With such abilities, farmers are assured of seed conservation. All in all, the use of such tractors may lead to higher return on investment since accuracy is enhanced.

One of the factors that hinder agricultural production in both developed and developing countries is the lack of enough labor. Normally, farmers grow a small section of land which they are sure to manage with their limited labor. However, with the adoption of the autonomous tractors, the problem of labor insufficiency is catered for since the number of employees needed to cultivate the farmland may be reduced.

Also data plays a significant role in determining the farmers' decisions. Usually, the absence of clear and reliable data can interfere with the decisions farmers make, and subsequently, have adverse impacts on the amount of outcome obtained from the fields. There are diverse sources and types of data that a farmer needs to succeed in their farming activities. For example, data on soil is important in that it helps farmers in determining what crops will do well in a given piece of land by establishing the moisture content, and the amount of nutrients. The autonomous tractors can be fitted with various sensors that can be used in the collection of data on the conditions of the soil, and hence, offer a platform for improving the outcome of the available crops. The elimination of the human interaction in farming following the use of autonomous tractors may thus be advantageous. Stressed employees cannot achieve the required efficiency level in the fields. Similarly, it is often hard for humans to manage diverse tasks on the farm especially where a large farmland is involved. Autonomous tractors have the appropriate sensors to offer the necessary help in the management of a several tasks in the farmland hence reducing stress and the workload in the farm.

The autonomous tractors run on high level technology that can be used in gathering high profile information. For example, some models have automatic steering abilities and GPS technologies which enhance the control of the tractors' course. The advanced sensors come in handy in the determination of soil moisture level, activities around planting and harvesting, present yield, as well as the amount of fuel needed for a given area of land. Additionally, other models of autonomous tractors can guide farmers on how to apply fertilizers.

Autonomous tractors allow precise control of work and farm equipment. This makes it possible for farmers to extend their working hours. The sensors fitted in the tractors can guide it in the right course even in conditions of reduced visibility and at night: work continues even during windy, dusty, and foggy conditions. Additionally, the ability of the tractors to reduce workload and stress on employees comes in handy in increased working hours in a day since the farmer has a greater flexibility in the management of growing tasks.

As indicted here above, the autonomous tractors can be fitted with various sensors that can be used in the collection of data on the conditions of the soil, and hence, offer a platform for improving the outcome of the available crops. Information can be gathered or exchanged by smartphones, portable computers, GPS sensors, RFID tags, and other environmental sensor networks. Current developments of sensor technology may lead to pervasive computing taking over the fields. Companies such as Ag Leader, Farm Works and SST sell handhelds with enhanced features, including more powerful processors, GPS sensors, high-resolution cameras, and built-in wireless and cellular interfaces. Increasingly, fields and farm equipment are equipped with smart sensors that can read everything from a plant's health and water needs to nitrogen levels in the soil and thus help to optimize irrigation and to avoid crop failure. New optical sensing technologies for crop health monitoring include Trimble's GreenSeeker, Topcon's CropSpec, and Ag Leader's Opt-Rx. These intelligent systems measure light reflectance from leaves, correlate it to nitrogen levels in the soil, and control application systems to apply optimal amounts of fertilizer. Sensors can also be sued to provide information about obstacles that prevent or mitigate the unhindered crossing of the autonomous tractor over farmland. However, developments here lean primarily on developments in the art of autonomous cars for road use.

OBJECT OF THE INVENTION

It is an object of the invention to provide an improved autonomous tractor for autonomously crossing farmland.

SUMMARY OF THE INVENTION

In order to meet the object of the invention, an autonomous tractor was devised, the tractor comprising one or more sensors for detection of an obstacle when crossing the farmland, and a central processing unit (CPU) for receiving input signals from the one or more sensors and for controlling the movement of the tractor based on the input signals in order to avoid the obstacle, a coupler for coupling an agricultural machine chosen from a group of agricultural machines each of which are able to be coupled to the tractor, and each of which comprise one or more additional sensors for detection of the obstacle, wherein the coupling of the agricultural machine comprises operatively connecting the one or more additional sensors to the CPU and automatically providing data to the CPU regarding the location of each of the one or more additional sensors on the agricultural machine and one or more specifications of each of these one or more additional sensors.

Applicant recognised that much improvement can be obtained in the area of obstacle sensing. Although it is known in the art to use sensors on an autonomous vehicle for obstacle detection, and also, to use sensors on the part of the tractor that holds the actual cultivating machine (being a part of a specialised tractor), no attention has been given to small versatile tractors that are devised to be coupled with various different agricultural machines. Applicant realised that it is advantageous in such a situation that the coupling of the agricultural machine comprises operatively connecting the sensors of the couple agricultural machine to the CPU of the tractor and automatically providing data to the CPU of this tractor regarding the location of each of the one or more additional sensors on the agricultural machine and one or more specifications of each of these one or more additional sensors. This means that the sensors of the agricultural machine are integrated into the system such that the system as a whole can operate autonomously in the best possible way.

Definitions

A tractor is an agricultural vehicle that is used to pull agricultural machinery and to provide the energy needed for the machinery to cultivate the land (including any harvesting action). It commonly but not necessarily is a powerful vehicle with a gasoline or diesel engine and large rear wheels or endless belt tracks (so called caterpillar tracks).

An autonomous tractor is a tractor that can perceive its environment, make decisions based on what it perceives and recognizes and then actuate a movement or manipulation within that environment. These decision-based actions include but are not limited to starting, stopping, and maneuvering around obstacles that are in its way. Such a tractor can cross farmland without needing continuous control of a human operator, and when an agricultural machine is operatively connected to the tractor, it can autonomously cultivate the land.

A road haulage truck is a motor vehicle designed to be able to transport items over the public road, either by pulling the item (if it has wheels for transport over the road) or by carrying the item on a (semi-) trailer. A road haulage truck may for example be a regular human operated tractor, or a truck-trailer combination (the trailer for example being a flatbed trailer).

A road is a long narrow stretch with a smoothed or paved hard surface, made for travelling by motor vehicle, carriage etc. between two or more points. A road is also referred to a street, or (high) way.

Farmland is land that is used for or suitable for farming.

A sensor is a device that responds to a physical stimulus such as heat, light, sound, pressure, magnetism, or a particular motion, and transmits a resulting impulse, for example for measurement or operating a control.

An obstacle is any item that prevents or impedes the free movement of an object in the environment. An obstacle can be a stationary physical item such as a big rock or a river, a movable item such as an animal or human being, but it can also be an imaginary item such as the border or a lot of land.

Above means at or to a place that is higher than someone or something.

The footprint of an item is the space the item occupies when viewed from above.

A wheel of a vehicle is an item arranged to revolve on an axis, such as a common spoked car wheel or a caterpillar track, which is used to convert a rotation (of the axis) into a translation of the vehicle.

A specification of a sensor denotes a parameter that is relevant for the capabilities of the sensors to pick up signals and to deliver corresponding output. Typical specifications are the "range", "accuracy", "resolution", "repeatability", "drift", "hysteresis", "stability", "response time", "settling time", "voltage required", "current drawn", "output" and "sensor noise estimation".

Automatically means without the need of (human) operator intervention. Automatically does not exclude that something is operator initiated or stopped as long the process can be completed without needing operator intervention.

A central processing unit or CPU is an electronic circuitry within a computer system that carries out the instructions of a computer program by performing the basic arithmetic, logic, controlling and input/output (I/O) operations specified by the instructions. The term "CPU" may refer to a tangible (single) processor, more specifically to its processing unit and control unit (CU), but may also refer to multiple processors distributed over a (wireless) networked system operating as if part of one single processor (for example partly present on the tractor, the machine and a remote server via a cloud system).

EMBODIMENTS OF THE INVENTION

In an embodiment of the tractor according to the invention, the output signal of a sensor is under the control of the CPU. Typically, the output of a sensor is controlled only by its input. A sensor simply provides an output signal depending on the input signal. However, applicant realised that in a tractor according to the invention it can be highly advantageous to put the sensor output also under the control of the CPU. This way, the totality of the sensors present, the type of tractor, the type of coupled agricultural machine and all other variables can be used to fine tune the output to help in achieving the best possible autonomous cultivating of the farmland. For example, under the control of the CPU a sensor that is present on the tractor and which faces the coupled machine, can be switched to a "no output" mode in order to prevent that the sensed machine is continuously seen as a regular obstacle that would hinder the movement of the tractor over the farmland.

In a next embodiment the controlling the movement of the tractor calculated by the CPU is additionally, thus next to the presence or non-presence of obstacles, based on one or more environmental circumstances of the tractor (excluding the presence or non-presence of any obstacle per se). Preferably the environmental circumstances are chosen from the group comprising 1) the presence of an agricultural machine adjacent the sensor, 2) the type of agricultural machine present, 3) the operating conditions of the agricultural machine, 4) the presence of a second autonomous tractor, 5) the physical properties of the farmland, 6) the weather conditions, 7) the type of said human being.

In another embodiment of the autonomous tractor according to the invention, the tractor comprises a connector for connecting the tractor to a road haulage truck for transport of the tractor over the road, wherein the direction of movement of the tractor for crossing the farmland is perpendicular to the direction of movement when the tractor is transported over the road. To be economically viable, many machines simply need a working width of at least 3 meters. Even stronger, many contemporary machines have working width exceeding 5-6 meters up to even 20 meters or more. This on itself makes such machines unsuitable for transport over the road, and there is no solution in legislation. This problem is also relevant for an autonomous tractor: many machines simply need to have a working width of at least 3 meters. However, applicant recognised that this problem can also be overcome by devising a tractor which has arrangements such that the direction of movement of the tractor when crossing the land is perpendicular to the direction of movement during road transport. This means that when moving along a road, the agricultural machine extends in the transport direction, and thus, the longitudinal direction of the road, which means that there are far less legal restrictions. According to EU regulation for example, the combination of a truck and trailer may have a length up to 18.75 meters. At the same time, when keeping the length of the autonomous tractor for example below 2.55 (thus being quite small), during transport its width will not exceed 2.55 which means EU regulation during transport over the road is met with. Still, a second recognition was needed to arrive at the tractor of this highly advantageous embodiment: autonomous movement over public roads requires new legislation and is far from being reality. However, to equip the tractor with a cabin for an operator to be able and drive the tractor would increase cost tremendously and maybe even completely counter the economic advantage of being autonomous. In order to solve this, the inventors recognised that a mechanically simple connector (a drawbar, a fifth wheel connector, a winch etc.) for connecting the tractor to a road haulage truck for transport of the tractor over the road will do the trick: for transport over the public road the tractor is seen as a trailer or cargo and not as a motored vehicle. This in combination with a small width, due to the perpendicular transport direction, makes sure that the tractor according to the invention meets the most important laws and regulations that currently apply in Europe and North America.

In an embodiment of the autonomous tractor according to the invention, the coupler is operable to move a coupled agricultural machine between two positions, the first of which is a position lateral to the tractor for cultivating the land, and the second of which is a position above the tractor. In this embodiment the agricultural machine can be lifted to and from the farmland, between a position to operate the land, and to a position above the tractor, away from the land. Preferably, the second position, i.e. the position above the tractor, coincides with a footprint of the tractor. In this preferred embodiment the machine can be lifted to actually right above the tractor. This is very advantageous during the transport of the tractor with a coupled machine over the road, since this means that the width in transport direction is not more than the width of the tractor, and also, since keeping a large weight such as that of a agricultural machine right above an item, poses less stringent conditions on the mechanics, when compared to a situation of keeping a large weight under an angle (i.e. less than 90° for example at 45°) above that item.

In another embodiment the tractor has a first set of wheels corresponding to the movement when crossing the farmland, and a second set of wheels corresponding to transport of the tractor over the road. Although one set of wheels could be used in the tractor of the invention, for example when arranged such that they can pivot such that their axis undergoes a 90° rotation to meet the perpendicular directions of movement, it has been found advantageous to use two sets of wheels, each set corresponding to either the direction of movement when crossing farmland or the direction of transport over the road. In a further embodiment the second set of wheels is arranged to be movable away from the farmland to prevent contact therewith when the tractor crosses the farmland.

In yet another embodiment wherein the connector comprises a drawbar, such that the tractor can be drawn onto a trailer or connected to be hauled as if a trailer, the drawbar is arranged to be put in an upright position when the tractor crosses the farmland.

The invention will now be further explained using the following figures.

DETAILED DESCRIPTION

FIG. 1

Figure 1:
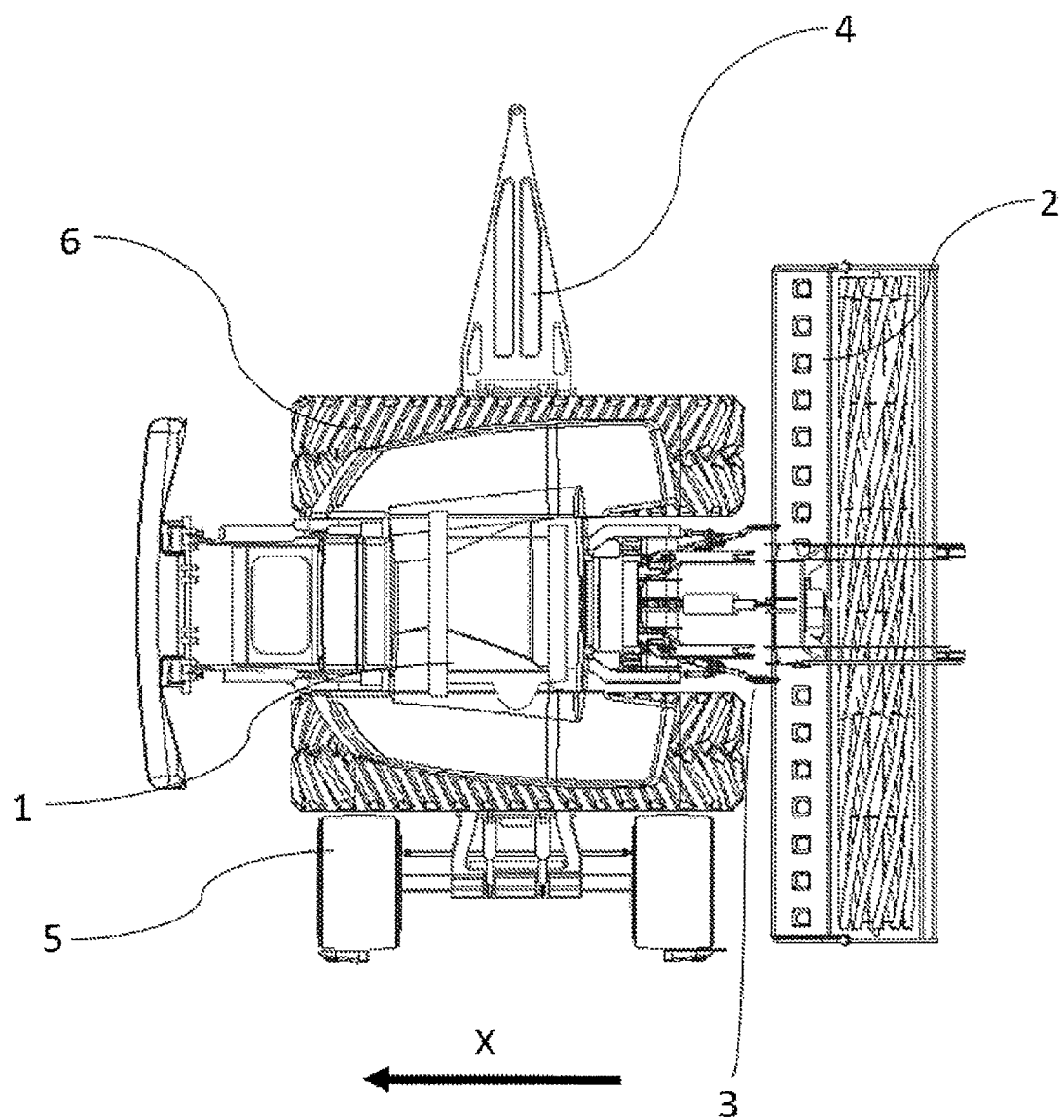
FIG. 1 is a schematic top plan view of an autonomous tractor.

FIG. 1 is a schematic top plan view of an autonomous tractor 1 for autonomously crossing farmland. The tractor crosses the farmland in the direction indicated as X. At is trailing end, coupled to the tractor via common triangle coupler 3 is a power harrow 2. The triangle has standard dimensions and drive axle such that various common agricultural machines can be coupled to the tractor. During the autonomous crossing of the farmland in direction X, the power harrow rests on the land for cultivating it. The tractor has an internal engine (not depicted) which drives the wheels 6 and the power harrow. For making sure the tractor is not principally hindered by any obstacles, the front side is provided with several sensors (not depicted) for detection of such obstacles when crossing the farmland. Laterally, the tractor is provided with a drawbar 4 and opposite thereof, with a second set of wheels 5. The drawbar and second set of wheels are not in use when the tractor crosses the farmland. They serve to help in transporting the tractor over the road. To enable thus, the drawbar can be used for connecting the tractor to a road haulage truck for transport of the tractor over the road, whereas the set of wheels 5 acts to provide rolling support. According to the invention, the direction of movement of the tractor for crossing the farmland (X) is perpendicular to the direction of movement when the tractor is transported over the road. The latter direction is indicated in FIG. 2.

FIG. 2

Figure 2:
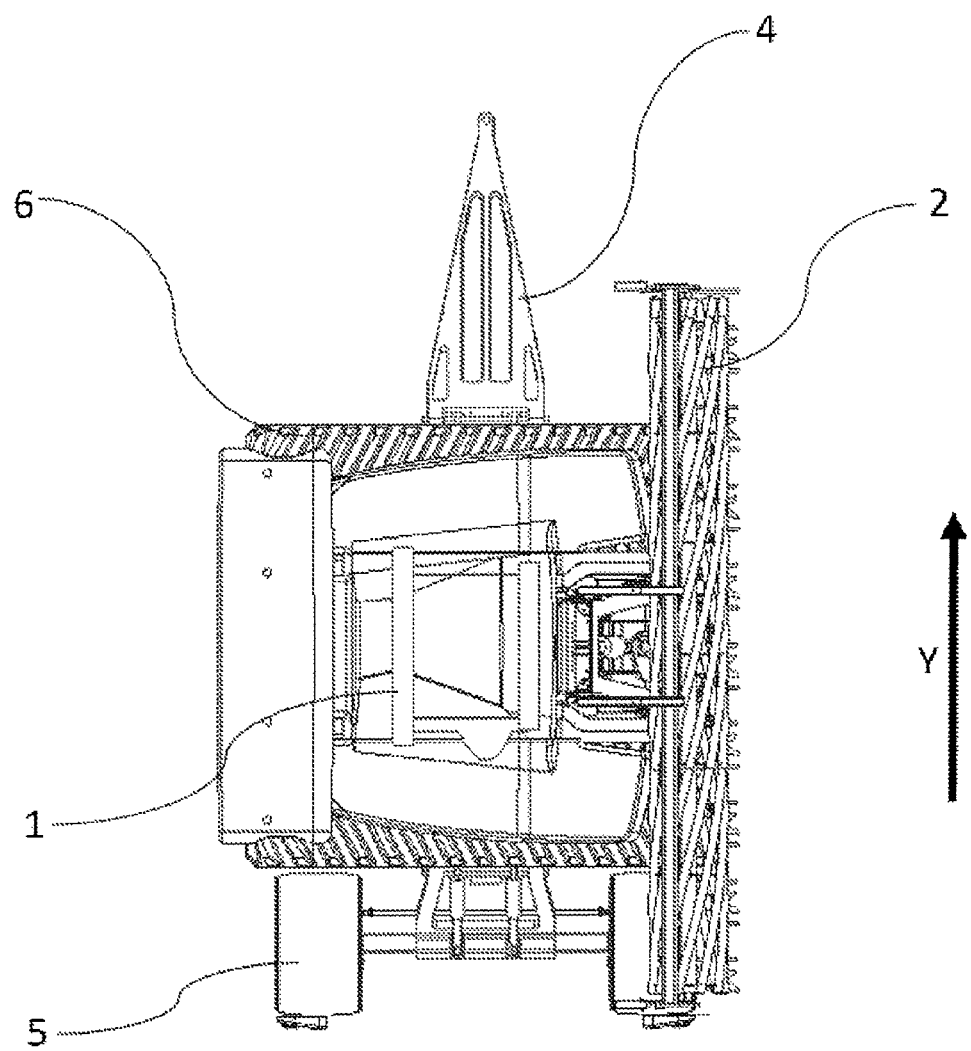
FIG. 2 is a schematic top plan view of the autonomous tractor of FIG. 1 with the agricultural machine in an elevated position.
Figure 3:
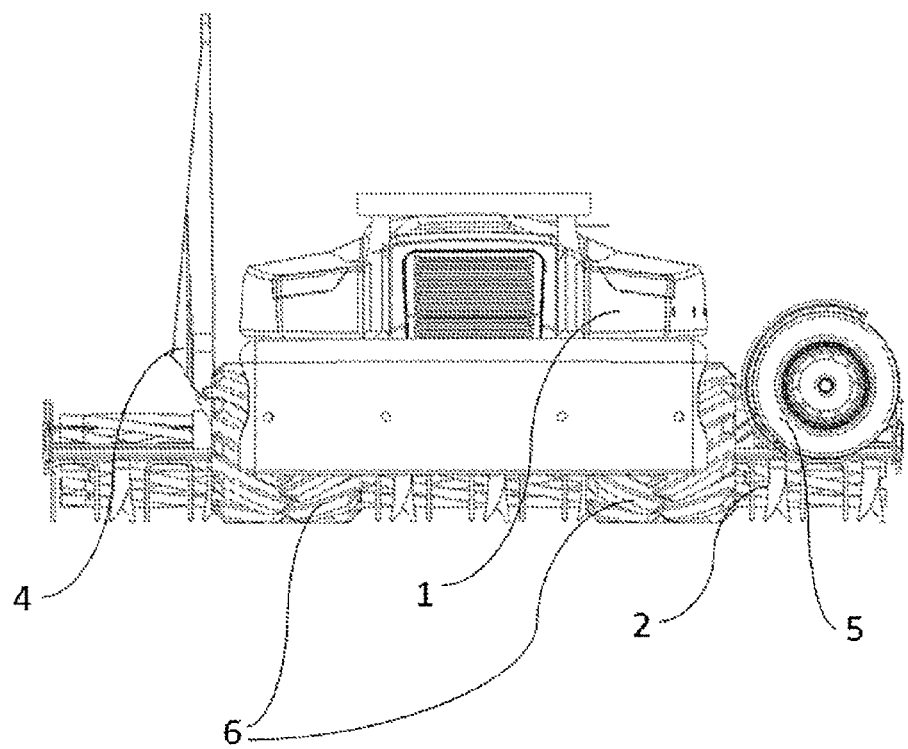
FIG. 3 is a schematic side view of the tractor, corresponding to FIG. 1.
Figure 4:
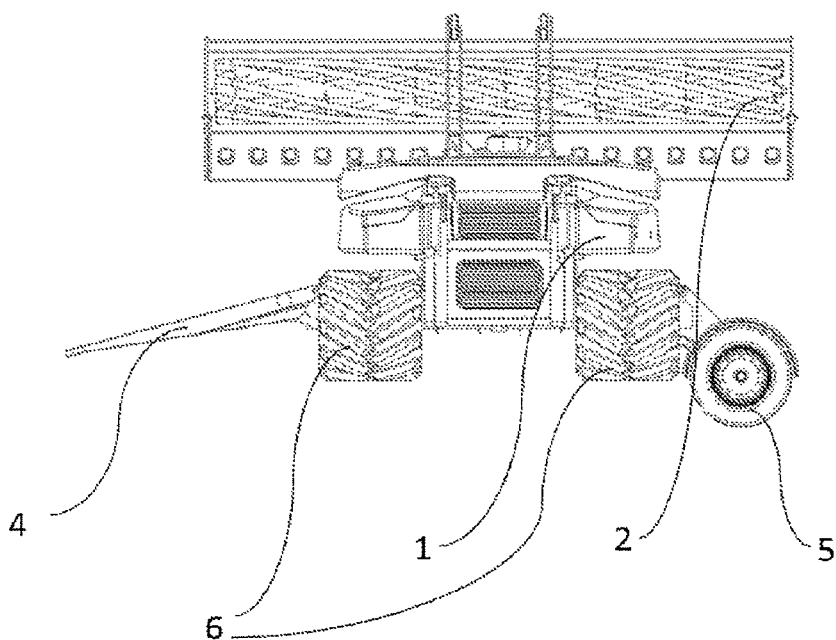
FIG. 4 is a schematic side view of the tractor, corresponding to FIG. 2.

FIG. 2 is a schematic top plan view of the autonomous tractor of FIG. 1 with the agricultural machine 2 in an elevated position. The coupler 3 is operable to move the coupled harrow between two positions (not excluding that the harrow can be put in any intermediate position), the first of which is the position lateral to the tractor for cultivating the land (as depicted in FIGS. 1 and 3), and the second of which is a position above the tractor. This is the position as depicted in FIG. 2. A corresponding side view is shown in FIG. 4. As a result of taking the second position above the tractor, the second position coincides with the footprint of the tractor, i.e. the harrow's footprint overlaps completely (over the width of the tractor) with the footprint of the tractor. The result is that the combination in the direction of transport indicated as Y, is not wider than the width of the tractor itself.

FIG. 3

FIG. 3 is a schematic side view of the tractor, corresponding to FIG. 1. In this side view the set of wheels 5 and the drawbar 4 are arranged in an elevated position so as to not interfere with the autonomous operation of the tractor.

FIG. 4

FIG. 4 is a schematic side view of the tractor, corresponding to FIG. 2. In this side view the set of wheels 5 and the drawbar 4 are arranged in a lowered position so as to be able to support the road haulage of the tractor. The drawbar is used for connecting to a human operated truck. The wheels 5 serve to provide a rolling support of the tractor during road haulage (see FIGS. 6, 7 and 8 for a combination of autonomous tractors with a human operated truck for road haulage).

FIG. 5

Figure 5A:
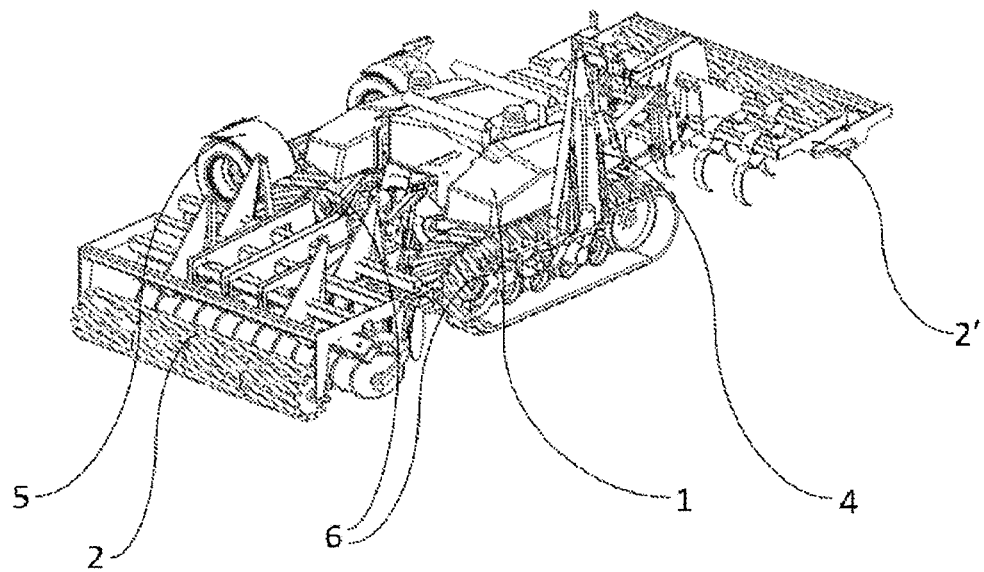
FIG. 5A is a schematic perspective view of an alternative autonomous tractor in a cultivation mode with the cultivating machines operational.
Figure 5B:
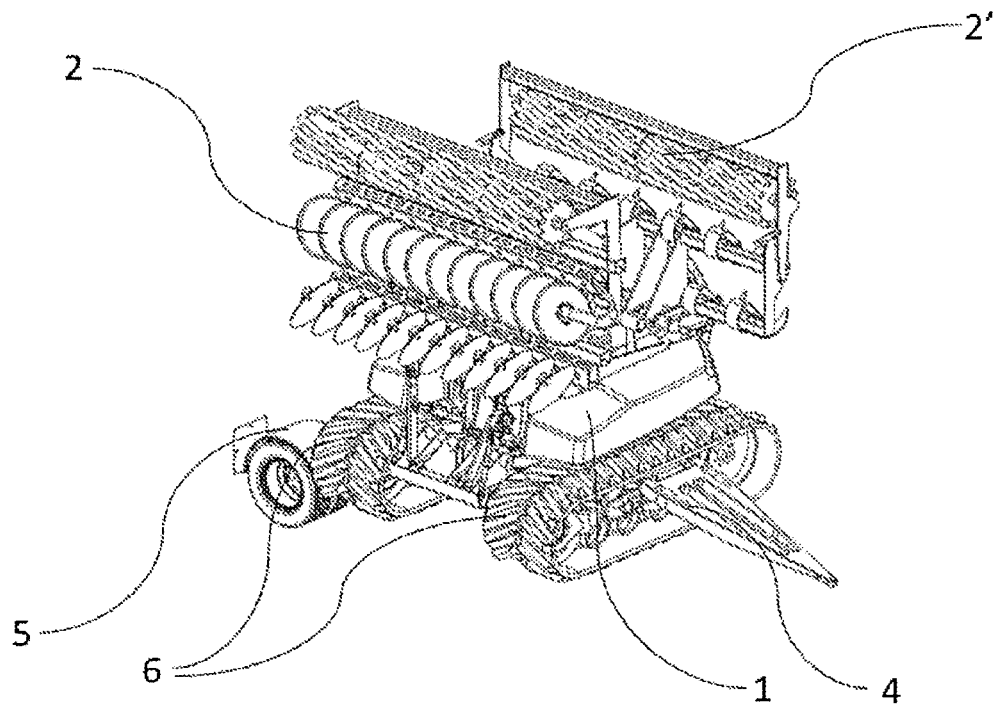
FIG. 5B is a schematic perspective view of the alternative autonomous tractor of FIG. 5A in a road haulage mode with the cultivating machines in an elevated position.

FIG. 5, consisting of FIGS. 5A and 5B, provide a schematic view of an alternative autonomous tractor 1. In FIG. 5A the tractor is shown in "cultivation" mode with a front end and trailing end agricultural machines 2 and 2' attached. Drawbar 4 and wheels 5 are in elevated position so as to not interfere with the cultivation of the farmland. FIG. 5B shows the same tractor with the machines 2 and 2' in elevated position, and the drawbar 4 and wheels 5 in lowered position enabling road haulage. As can be seen, the advantage of a lack of a cabin for a human operator is that the machines can be elevated to a completely upright position, leading to the smallest width possible during road haulage and also, leading to less stringent mechanical demands for the couplers: the forces exerted on these couplers during transport are much smaller when the machines are right above the couplers, when compared to a situation wherein the machines are coupled under an angle of for example 45°.

FIG. 6

Figure 6:
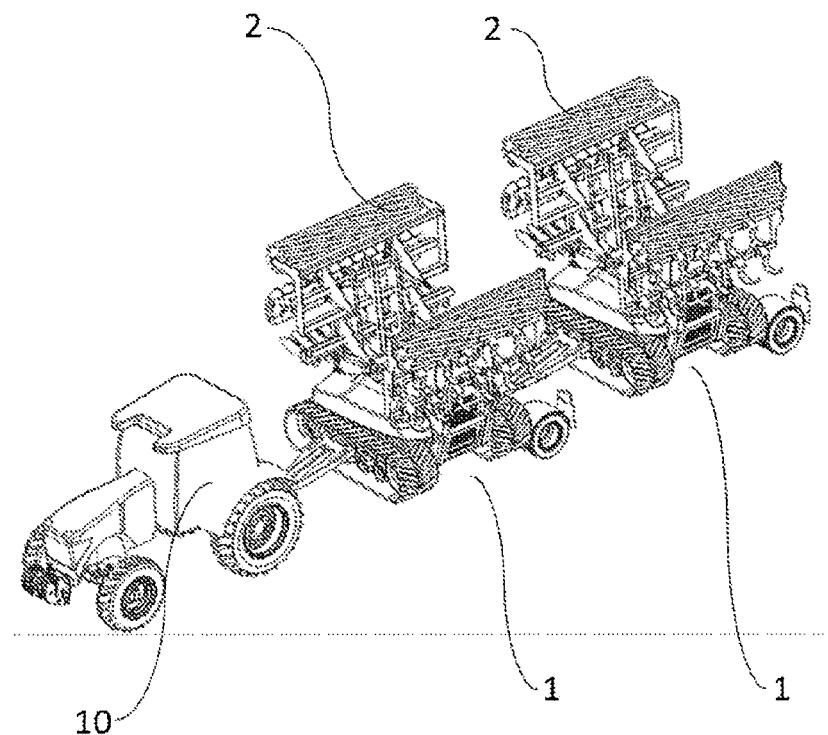
FIG. 6 is a schematic view of two autonomous tractors pulled by human operated tractor serving as a road haulage truck for transport over the road.

FIG. 6 is a schematic view of two autonomous tractors 1 as depicted in FIG. 5, pulled by human operated tractor 10 serving as a road haulage truck for transport over the road. Both tractors 1 have the agricultural machines elevated to an upright position to provide for the smallest width possible.

FIG. 7

Figure 7:
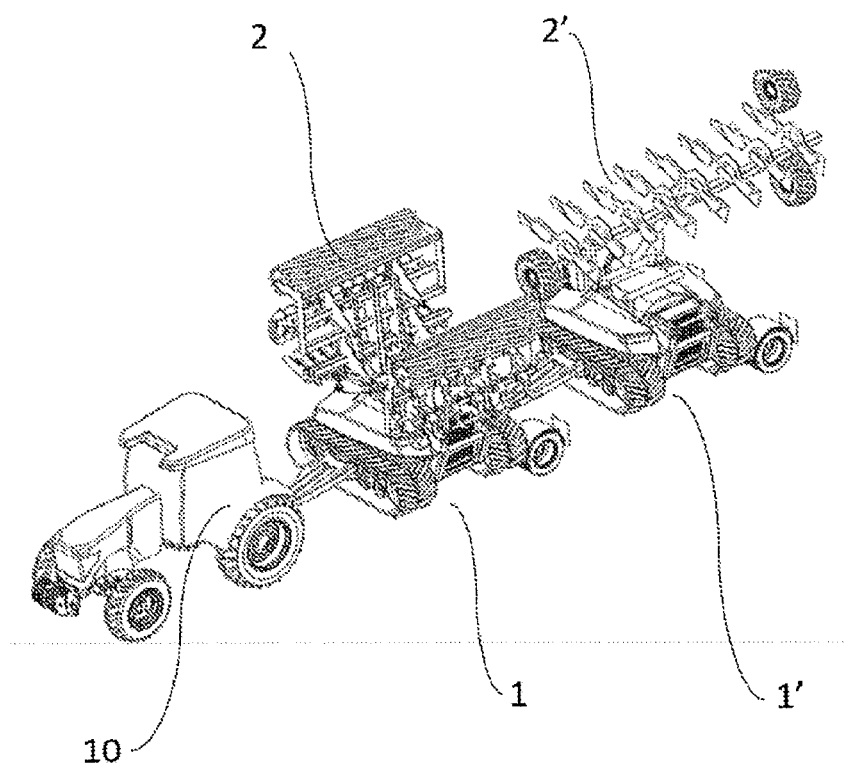
FIG. 7 is a schematic view of an alternative arrangement of the combination as shown in FIG. 6.

FIG. 7 is a schematic view of an alternative arrangement of the combination as shown in FIG. 6. In this embodiment, the tractor 10 pulls two autonomous tractors 1 and 1' to which different agricultural machines are coupled.

FIG. 8

Figure 8:
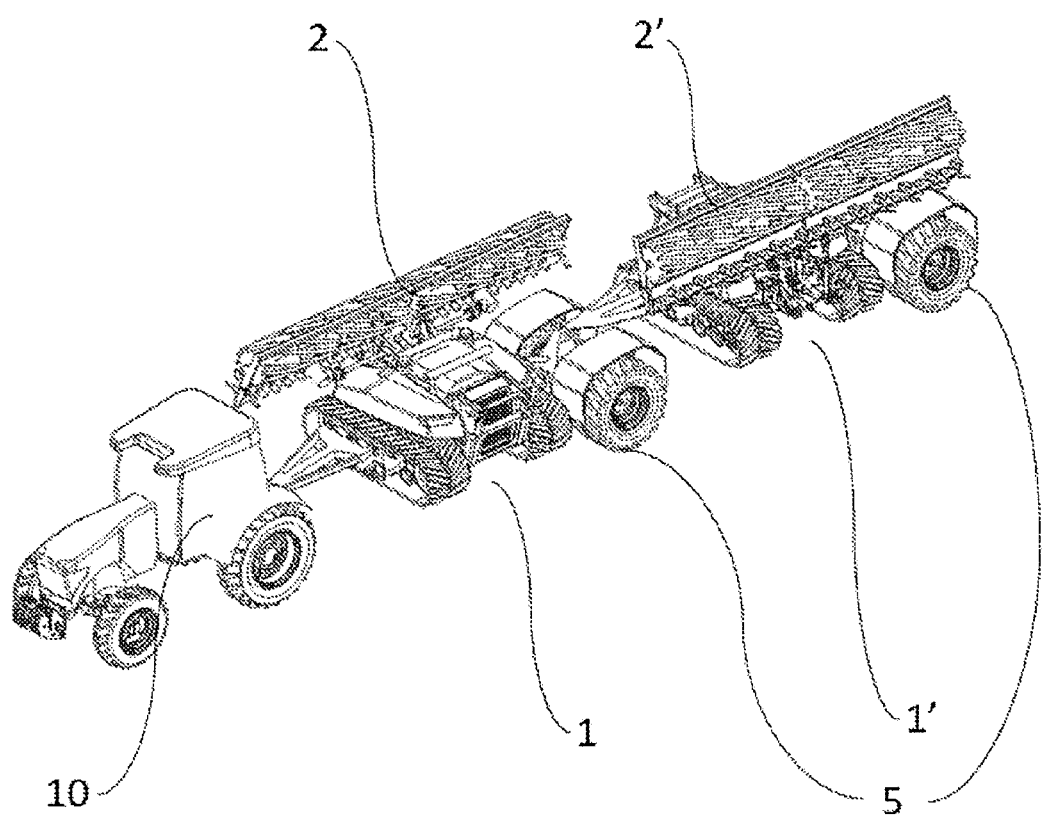
FIG. 8 is a schematic view of a further alternative arrangement of the combination as shown in FIGS. 6 and 7.

FIG. 8 is a schematic view of a further alternative arrangement of the combination as shown in FIGS. 6 and 7. In this combination the drawbars 4 and wheels set 5 are arranged on opposite sides of each tractor (when compared to each other), providing the advantage that the agricultural machines during transport over the road are present at opposite sides of each tractor. This decreases the risk that the machines mechanically interfere with the road transport.

FIG. 9

Figure 9:
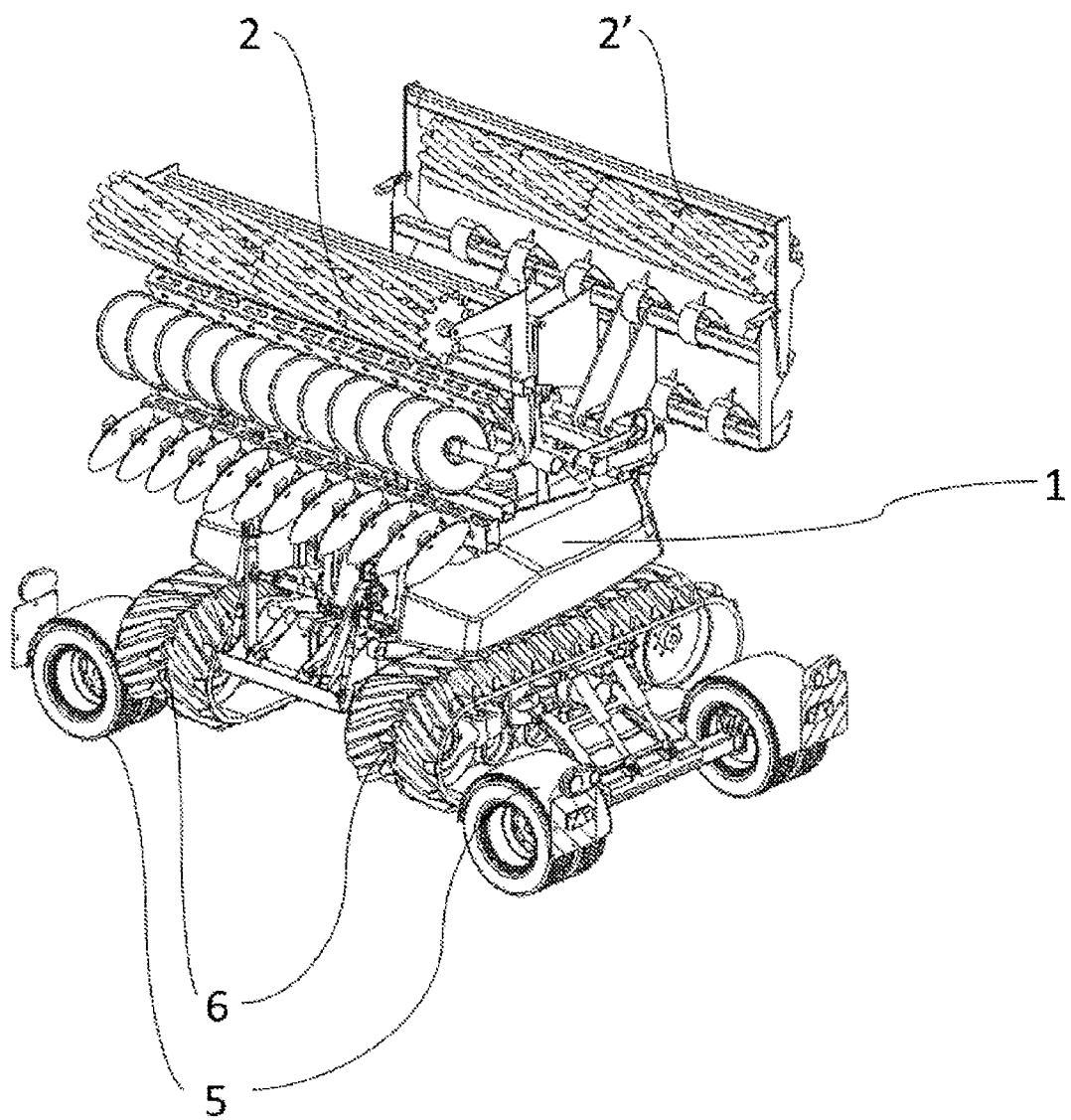
FIG. 9 is an example of an autonomous tractor suitable for autonomous transport over the road.

FIG. 9 schematically depicts an example of an autonomous tractor suitable for autonomous transport over the road. In this embodiment at least one of the axles of wheels 5 is actuated by the motor of the tractor, and this axle, and/or the other one, may be arranged as a steering axle that can be used to navigate the road. The technology for the autonomous transport/driving of this tractor over the road may be the same as present day technology used for autonomous cars.

FIG. 10

Figure 10A:
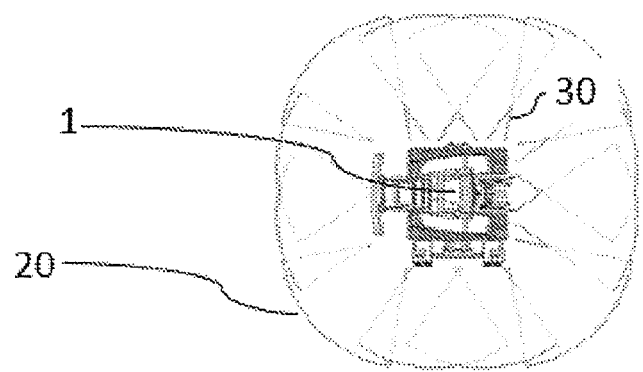
FIG. 10A schematically shows the implantation of various sensors in an autonomous tractor without an agricultural machine coupled thereto.
Figure 10B:
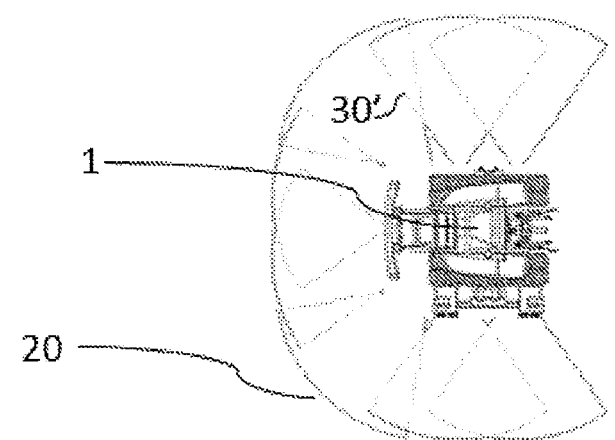
FIG. 10B schematically shows the implantation of various sensors in an autonomous tractor with an agricultural machine coupled thereto.
Figure 10C:
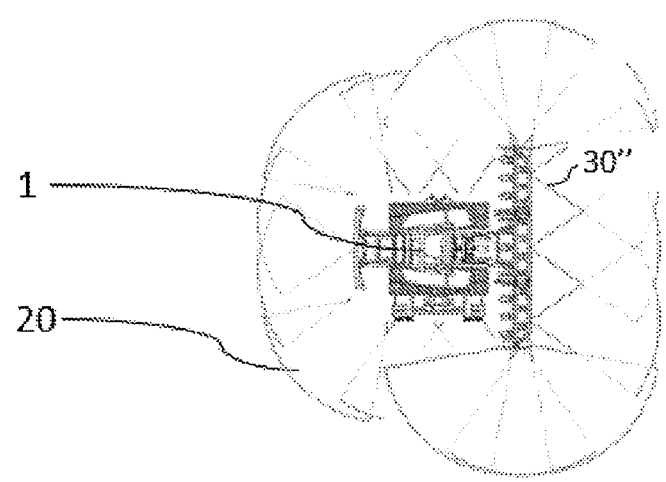
FIG. 10C schematically shows the implantation of various sensors in an autonomous tractor with an agricultural machine coupled thereto and connected to the CPU.

FIG. 10, comprising sub-FIGS. 10A, 10B and 10C schematically shows the implantation of various sensors in line with the invention. In FIG. 10A an autonomous tractor without an agricultural machine coupled thereto is depicted. The sensors (not shown) create a virtual cage 30 in an area 20. If an obstacle, for example a person, is sensed in the virtual cage 30, the CPU will react to control the movement of the tractor to avoid overriding the person, e.g. by stopping the machine, or by (anticipating) slowing down and at the same time providing a light and sound signal to warn the person of the vicinity of the tractor.

FIG. 10B shows the situation wherein an agricultural machine 2 is connected to the tractor (the machine 2 itself is not depicted in FIG. 10B for reasons of clarity; see FIG. 10O for the actual machine 2 being present). In line with the invention, as soon as the machine is (electronically) connected to the CPU of the tractor (which maybe via a hardware connection using a connector/ISOBUS etc., or via a wireless connection) the CPU is provided automatically with data regarding the location of each of the one or more additional sensors on the agricultural machine and one or more specifications of each of these one or more additional sensors. In this embodiment, the CPU automatically shuts off the sensors of the tractor that sense the agricultural machine leading to adjusted virtual cage 30' (as depicted in FIG. 10B). This virtual cage 30' is in fact the same cage as 30, minus the part facing the agricultural machine. Once connected, the CPU also automatically shuts on the sensors of the agricultural machine. This leads to the virtual cage 30" as depicted in FIG. 10O. As a consequence, the combination of tractor and machine can operate with the combined sensors on the tractor and machine, in essence "seeing" the combination of the tractor and agricultural machine as one unit for crossing the farmland.

In practice it may be that several independent tractors will cross the same lot of farmland simultaneously to cultivate the land together. If so, it is important that the various tractors (plus machines) do not see each other as regular obstacles, which could lead to a situation that they react to each other, stop and don't continue to work. So as soon as various autonomous tractors are working close to each other there should be communication between the combinations about position, speed, and travel direction but also about dimensions implements have. The sensors can be useful in this respect.

Another aspect of the invention is that the tractors may be able to distinguish between (curious) spectators and an operator. Where the machine has to be 100% safety proof for general public, the operator sometimes has to observe the tractor and/or machine closely to real time adjust and verify the result of the cultivation job executed by the machine. This could for example lead to a system wherein if a common spectator is sensed within 10 meters of the tractor at a certain speed, the machine starts providing light and sounds signals, or even stops if the spectator is within 5 meters of the tractor, whereas for an operator such actions are only undertaken at 3 and 1 meter respectively when the tractor travels at the same speed. An operator could for example be recognised via wireless communication between the CPU of the tractor and a smartphone, or other hand held device of the operator, or by sensing a physical property of the operator (such as the iris, face, or any other physical characteristic). Also, output signals of one or more sensors connected to an operator may be used as input for the CPU. In an embodiment, as soon as the operator is present in the virtual cage, he (or she) receives a signal thereabout. This improves the safety of the operating conditions.

FIG. 11

Figure 11:
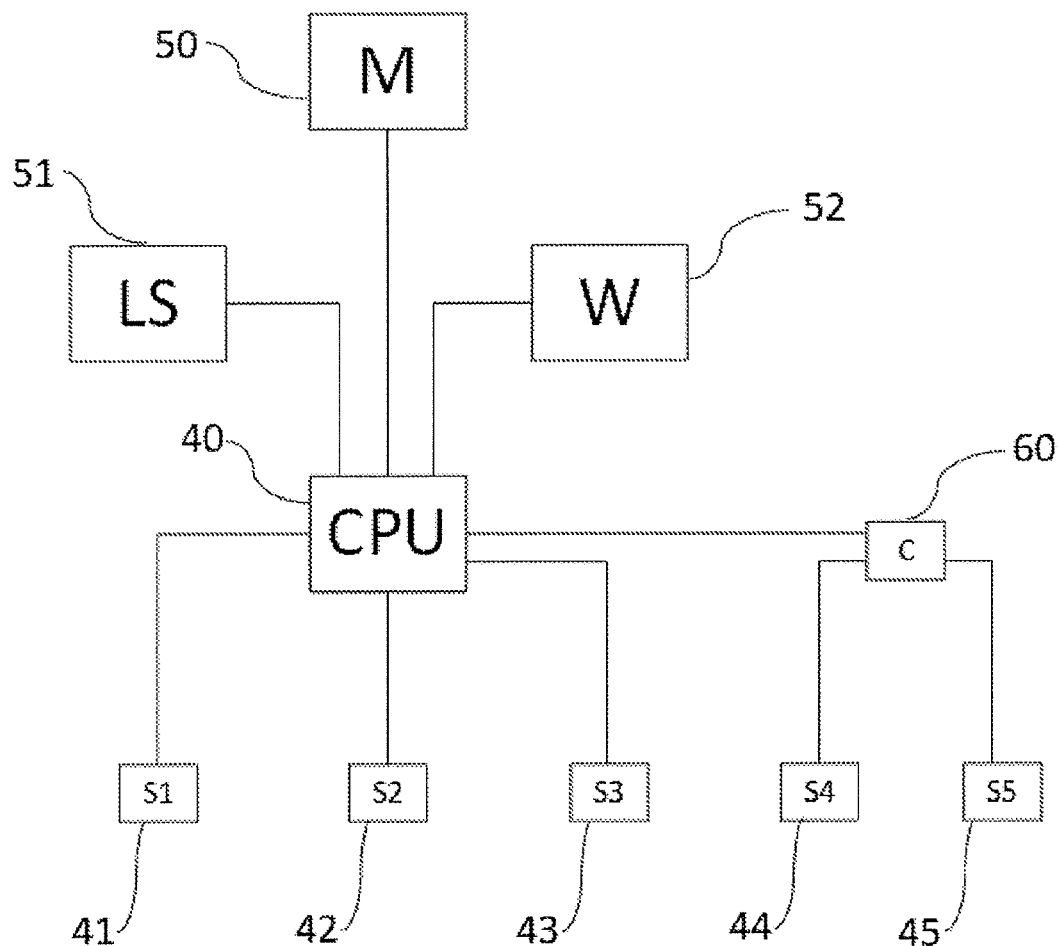
FIG. 11 schematically depicts the arrangement of sensors and CPU.

FIG. 11 schematically depicts the arrangement of sensors 41 through 45 and CPU 40 in a combination of a tractor and agricultural machine according to the invention. The sensors 41, 42 and 43 are part of the tractor and have a fixed connection with the CPU 40. They provide an output signal to the CPU, which in turn controls and actuates the motor 50 of the tractor ("M"), a light and sound warning system 51 ("LS") and/or a (virtual) steering wheel 52 ("W"). The sensors 44 and 45 are part of the agricultural machine and connected to the CPU via connector 60.

What is claimed is:

1. An autonomous tractor for autonomously crossing farmland, comprising:
   a tractor,
   one or more sensors on the tractor for detection of an obstacle when crossing the farmland,
   a central processing unit (CPU) for receiving input signals from the one or more sensors and for controlling movement of the tractor based on the input signals in order to avoid an obstacle,
   a coupler for coupling an agricultural machine chosen from a group of agricultural machines to the tractor, and one or more additional sensors for detection of the obstacle on each of the agricultural machines, wherein the one or more additional sensors are operatively connected to the CPU when the agricultural machine is operatively connected to the tractor, and automatically providing data to the CPU when the agricultural machine is operatively connected to the tractor regarding the location of each of the one or more additional sensors on the agricultural machine and one or more specifications of each of these one or more additional sensors.

2. An autonomous tractor according to claim 1, wherein the output signal of each said sensor is under the control of the CPU.

3. An autonomous tractor according to claim 1, wherein the controlling movement of the tractor calculated by the CPU is additionally based on one or more environmental circumstances of the tractor.

4. An autonomous tractor according to claim 3, wherein the environmental circumstances are chosen from the group comprising 1) the presence of an agricultural machine adjacent the sensor, 2) the type of agricultural machine present, 3) the operating conditions of the agricultural machine, 4) the presence of a second autonomous tractor, 5) the physical properties of the farmland, 6) the weather conditions, 7) the presence of a human spectator in the vicinity of the tractor, 8) the presence of a human operator in the vicinity of the tractor.

5. A method to cultivate farmland comprising autonomously crossing the farmland with an autonomous tractor according to claim 1.

* * * * *